United States Patent
Lee et al.

(10) Patent No.: US 10,853,446 B2
(45) Date of Patent: Dec. 1, 2020

(54) METHODS AND SYSTEMS FOR COMPLEXITY REDUCTION IN DISCRETE FOURIER TRANSFORM COMPUTATIONS

(71) Applicant: Apple Inc., Cupertino, CA (US)

(72) Inventors: Chris C. Lee, San Jose, CA (US); Ali Sazegari, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 16/144,318

(22) Filed: Sep. 27, 2018

(65) Prior Publication Data

US 2019/0384803 A1 Dec. 19, 2019

Related U.S. Application Data

(60) Provisional application No. 62/685,851, filed on Jun. 15, 2018.

(51) Int. Cl.
  *G06F 17/14* (2006.01)
  *G06F 9/54* (2006.01)

(52) U.S. Cl.
  CPC .......... *G06F 17/142* (2013.01); *G06F 17/147* (2013.01); *G06F 9/54* (2013.01)

(58) Field of Classification Search
  None
  See application file for complete search history.

(56) References Cited

U.S. PATENT DOCUMENTS

| 9,973,365 B2 | 5/2018 | Ma et al. |
| 2005/0102342 A1 | 5/2005 | Greene et al. |
| 2006/0248135 A1 | 11/2006 | Cousineau et al. |
| 2008/0071848 A1 | 3/2008 | Baireddy et al. |
| 2008/0126462 A1* | 5/2008 | Xu .......... G06F 17/142 708/405 |
| 2014/0280421 A1 | 9/2014 | Yang et al. |
| 2016/0314096 A1 | 10/2016 | Brett et al. |

FOREIGN PATENT DOCUMENTS

CN 105224505 A 1/2016

OTHER PUBLICATIONS

Butterfly Diagram downloaded from Wikipedia free Encyclopedia https://en.wikipedia.org/wiki/Butterfly_diagram on Sep. 7, 2018, 3 pages.

* cited by examiner

*Primary Examiner* — Michael D. Yaary
(74) *Attorney, Agent, or Firm* — Jaffery Watson Mendonsa & Hamilton LLP

(57) ABSTRACT

In one embodiment, a computer-implemented method of discrete Fourier transform (DPT), FFT, or DCT computations on a system comprising a processor is described herein. In one example, the method includes receiving, with the processor, input complex samples from memory of the system, determining input vectors based on the received input complex samples, determining a DFT radix p of p macro blocks based on the input vectors, determining p independent DFT-L vectors based on the p macro blocks with L being based on p, and generating p DFT-N output vectors without reordering or shuffling output data based on the p independent DFT-L vectors.

23 Claims, 6 Drawing Sheets

METHODS AND SYSTEMS FOR COMPLEXITY REDUCTION IN DISCRETE FOURIER TRANSFORM COMPUTATIONS

CROSS REFERENCE

This application claims benefit of U.S. Provisional Application No. 62/685,851, filed Jun. 15, 2018, which is hereby incorporated herein by reference.

TECHNICAL FIELD

This disclosure relates to the field of discrete Fourier transform (DFT) processing.

BACKGROUND

Many modern signal processing arts rely on a digital frequency domain representation of the signals of a processing unit. An N-point discrete Fourier transform (DFT) is one approach to convert a signal in the time (or space) domain to the frequency domain. An N-point DPT can be written as $y[k]=\Sigma x[n]*w^{nk}$, where $x[n]$ is the time-domain signal sequence, $w=\exp^{(-i\ 2\pi/N)}$, and the summation ranges over n=0 to N−1. In general, the symmetry in the weights w can be used to facilitate efficient processing to save computation costs. When N is a power of 2, the symmetry has been well studied and it leads to the area of Fast Fourier transform (FFT). Still, a problem of considerable complexity exists even for FFTs when N is not trivial. The output elements are not naturally ordered in location. To solve this problem, approaches either using extra storage or a separate location switching (or matrix transposing) function to reorder the elements have been used. However, these approaches all increase the overall complexity (in storage or computation).

SUMMARY OF THE DESCRIPTION

Objects of the systems and methods described herein include efficient implementation of discrete Fourier transform (DFT), fast Fourier transform (FFT), and discrete cosine transform (DCT) computations on processing units with vector processing engines. A DCT is a Fourier-related transform that is similar to a DFT. The DCT is expressed with cosine functions and only uses real numbers though. This implementation is specifically arranged so that a complicated operation of elements location switching (or matrix transpose) can be absorbed into the other functions. This leads to a high-performance implementation of at least one of the DFT, FFT and DCT functions on programmable vector units on modern computer CPUs.

In one embodiment, a computer-implemented method of discrete Fourier transform (DFT) computations on a system comprising a processor is described herein. The method includes receiving, with the processor, input complex samples from memory of the system, determining input vectors based on the received input complex samples, determining a DFT radix p of p macro blocks based on the input vectors, determining p independent DFT-L vectors based on the p macro blocks with L being based on p, and generating p DFT-N output vectors without reordering or shuffling output data based on the p independent DFT-L vectors.

In an embodiment, determining a DFT radix p of p macro blocks comprises determining reduced-complexity radix-p butterfly of p sections.

In another embodiment a non-transitory computer readable can store executable instructions, that when executed by a processing system, can perform any of the functionality described above.

In yet another embodiment, a processing system coupled to a memory programmed with executable instructions can, when the instructions are executed by the processing system, perform any of the functionality described above.

In another embodiment, a computer-implemented method of discrete Fourier transform (DFT) computations on a system comprising a processor is described herein. The method includes receiving, with the processor, input complex samples from memory of the system, determining input vectors based on the received input complex samples, determining a DFT of macro blocks based on the input vectors, determining independent DFT-L vectors based on the macro blocks, and generating DFT-N output vectors without reordering or shuffling output data based on the independent DFT-L vectors.

In an embodiment, determining a DFT of macro blocks comprises determining multiply-less butterfly of 4 sections, wherein N is a multiple of 16, M=N/4, and L=M/4.

In another embodiment a non-transitory computer readable can store executable instructions, that when executed by a processing system, can perform any of the functionality described above.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized, and that logical, mechanical, electrical, functional, and other changes may be made without departing from the scope of the present disclosure. The following detailed description is, therefore, not to be taken in a limiting sense, and the scope of the present invention is defined only by the appended claims.

The present design absorbs or combines a matrix transposing operation into other functions or operations in an efficient implementation of at least one of the DFT, FFT, and DCT computation on modem CPU vector processing units. In one example, the present design utilizes an algorithm to do DFT-N (e.g., N is a multiple of 4×4, N is a multiple of $p^2$) in-place, to save extra effort for matrix transpose, and to produce high-performance DPT computation engine (or FFT computation engine or DCT computation engine). In one example, in-place operations occur without creating a new copy of inputs and/or outputs to avoid additional memory allocations.

Processors frequently perform DFT, FFT, and DCT computations for numerous tasks including phone and video calls (e.g., preprocessing and postprocessing of digital signals, echo cancellation, noise cancellation, voice processing (telephony), voice synthesis (recognition), etc.), audio applications, angle of arrival, time of flight, audio codes such as AAC-ELD (enhanced low delay), MP3, and other applications. DFT computations may be needed millions of times for certain applications. The present design provides a reduction of a number of cycles for a processor for performing these computations (e.g., DFT computations, FFT computations, DCT computations) that are performed millions of times. Thus, the number of cycles for a processor for performing these computations (e.g., DFT computations, FFT computations, DCT computations) are significantly reduced and this reduces energy consumption and battery source consumption. In one example, DCT and DFT computations are performed. DCT signals are real signals (non-imaginary signals). A DCT signal is mapped or folded into a complex signal of reduced size, calling a DFT operation, and then unfolding or reverse mapping a DFT output complex signal back to a DCT real signal of original length.

Figure 1:
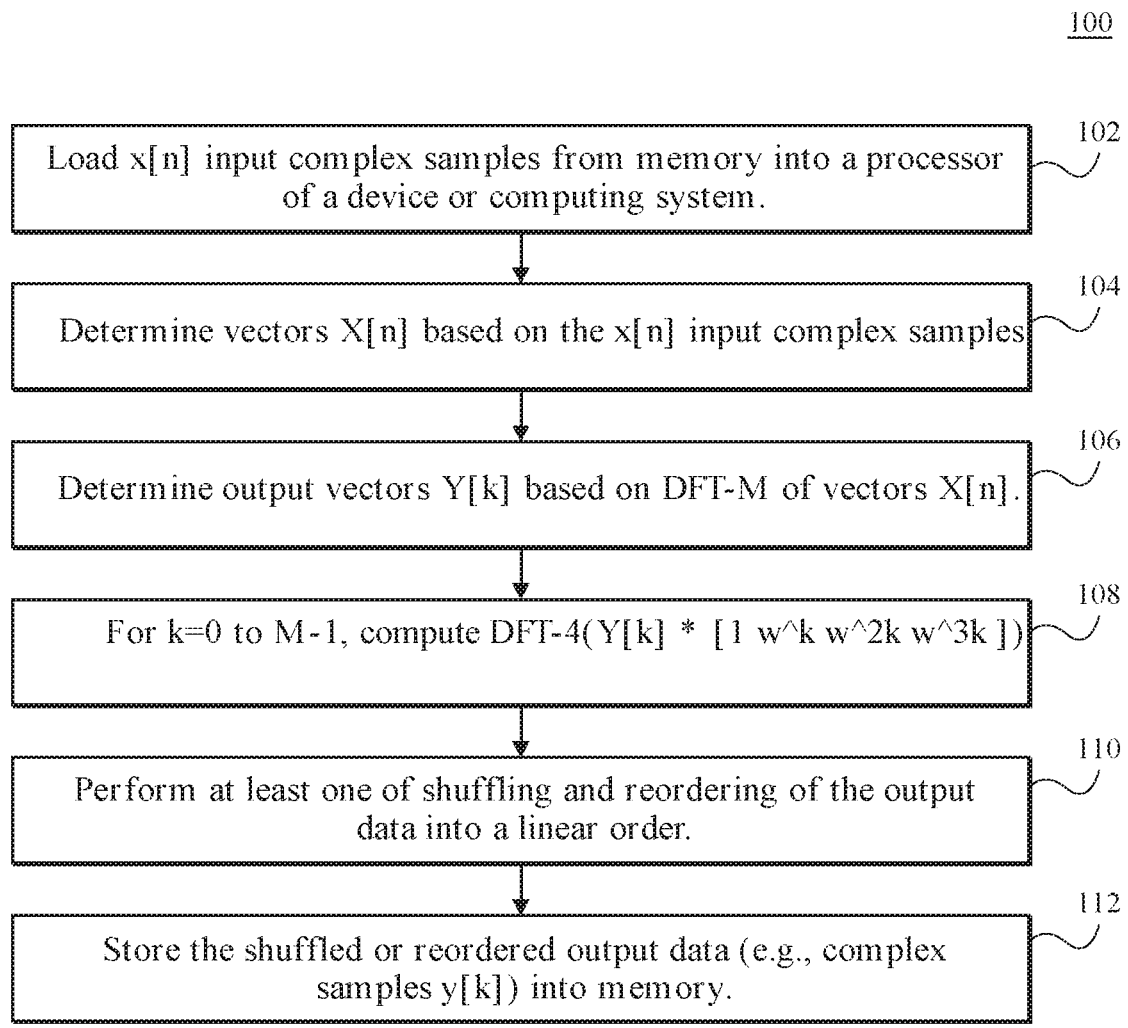
FIG. 1 illustrates, a method of DFT computations on a processor.

FIG. 1 illustrates, a method 100 of DFT computations on a processor. Method 100 represents a DFT-N computation flow chart that can be executed with a processor.

At operation 102, x[n] input complex samples are loaded from memory into a processor of a device or computing system. At operation 104, the processor determines vectors X[n] based on the x[n] input complex samples. In one example, X[n]=[x[4n] x[4n+1] x[4n+2] x[4n+3]]. At operation 106, output vectors Y[k] are determined based on DFT-M: of vectors X[n] with N=4*M. At operation 108, for k=0 to M−1, compute [y[k] y[k+M] y[k+2M] y[k+3M] being equal to DFT-4(Y[k]*[1 $w^k$ $w^{2k}$ $w^{3k}$]). In this example, w=$\exp^{(-i\ 2\pi/N)}$.

At operation 110, the processor performs at least one of shuffling and reordering of the output data into a linear order. In this example, [y[0] y[M] y[2M] y[3M] y[1] y[1+M] y[1+2M] y[1+3M] . . . ] is shuffled or reordered into [y[0] y[1] y[2] y[3] y[4] y[5] y[6] . . . ]. At operation 112, the shuffled or reordered output data (e.g., complex samples y[k]) are stored into memory.

A DFT computation for method 100 can be expressed as follows:

$$y[k]=\Sigma\ x[n]*w^{nk},$$

where x[n] is an input N-point complex number sequence and y[k] is an output N-point complex number sequence. In one example, a complex number w=$\exp^{(-i\ 2\pi/N)}$, and i=sqrt (−1). The summation ranges over n=0 to N−1.

Next, DFT-N is rewritten by decimating the time sequence x[n] into 4 sub-sequences x[4n], x[4n+1], x[4n+2], and x[4n+3].

$$y[k]=\Sigma\ x[4n]*w^{4nk}+\Sigma\ x[4n+1]*w^{4(n+1)k}+\Sigma\ x[4n+2]*w^{4(n+2)k}+\Sigma\ x[4n+3]*w^{4(n+3)k}.$$

This summation ranges over n=0 to M−1 with N=4*M. Let w'=$\exp^{(-i\ 2\pi/M)}$=$\exp^{(-i\ 2\pi*4/N)}$=$w^4$.

$$y[k]=\Sigma\ x[4n]*w'^{nk}+w^k*\Sigma\ x[4n+1]*w'^{nk}+w^{2k}*\Sigma\ x[4n+2]*w'^{nk}+w^{3k}*\Sigma\ x[4n+3]*w'^{nk}$$

Note that DFT-M can be expressed as y[k]=Σ x[4n]*$w'^{nk}$, n=0, . . . , M−1.

$$y[k]=\text{DFT-}M(x[4n])+w^k*\text{DFT-}M(x[4n+1])+w^{2k}*\text{DFT-}M(x[4n+2])+w^{3k}*\text{DFT-}M(x[4n+3]).$$

Then, let vector X[n]=[x[4n] x[4n+1] x[4n+2] x[4n+3]]. This is equivalent to dividing N scalars into M vectors (each vector has 4 consecutive scalars). DFT-M of the vectors (native to modern CPUs with vector processing unit):

$$Y[k]=\Sigma\ X[n]*w'^{nk},\ n=0,\ldots,M-1$$

Each component in the vector sequence V[k] is equal to
1. y0[k]=DFT-M(x[4n])
2. y1[k]=DFT-M(x[4n+1])
3. y2[k]=DFT-M(x[4n+2])
4. y3[k]=DFT-M(x[4n+3])

$$y[k]=y0[k]+w^k*y1[k]+w^{2k}*y2[k]+w^{3k}*y3[k].$$

The y0, y1, y2, and y3 are all circular modulo M, i.e., y0[k]=y0[k+M]=y0[k+2M]=y0[k+3M] for k=0, . . . , M−1. In computing, a modulo operation determines a remainder after division of a first number by a second number.

The DFT-N output y[k] can be reconstructed from 4 DFT-M output according to (% means modulo M operation):

$$y[k]=y0[k\%M]+w^k*y1[k\%M]+w^{2k}*y2[k\%M]+w^{3k}*y3[k\%M].$$

Note that $w^M$=$\exp(-i\ 2\pi M/N)$=−i, $w^{2M}$=−1, $w^{3M}$=i.

$$y[k]=y0[k]+w^k*y1[k]+w^{2k}*y2[k]+w^{3k}*y3[k]$$

$$y[k+M]=y0[k]-i*w^k*y1[k]-w^{2k}*y2[k]+i*w^{3k}*y3[k]$$

$$y[k+2M]=y0[k]-w^k*y1[k]+w^{2k}*y2[k]-w^{3k}*y3[k]$$

$$y[k+3M]=y0[k]+i*w^k*y1[k]-w^{2k}*y2[k]-i*w^{3k}*y3[k].$$

The above indicates that DFT-4 of the k-th vector in Y[k] (DFT-M of vectors X[n]), weighted by (1 $w^k$ $w^{2k}$ $w^{3k}$), will yield DFT-IN output samples y[k], y[k+M], y[k+2M], y[k+3M]. Performing this computation sequentially from k=0 to M−1 requires extra storage to save output that the input has not yet read from memory if the computation is performed in place (e.g., x[ ] and y[ ] occupy the same memory location).

Figure 2:
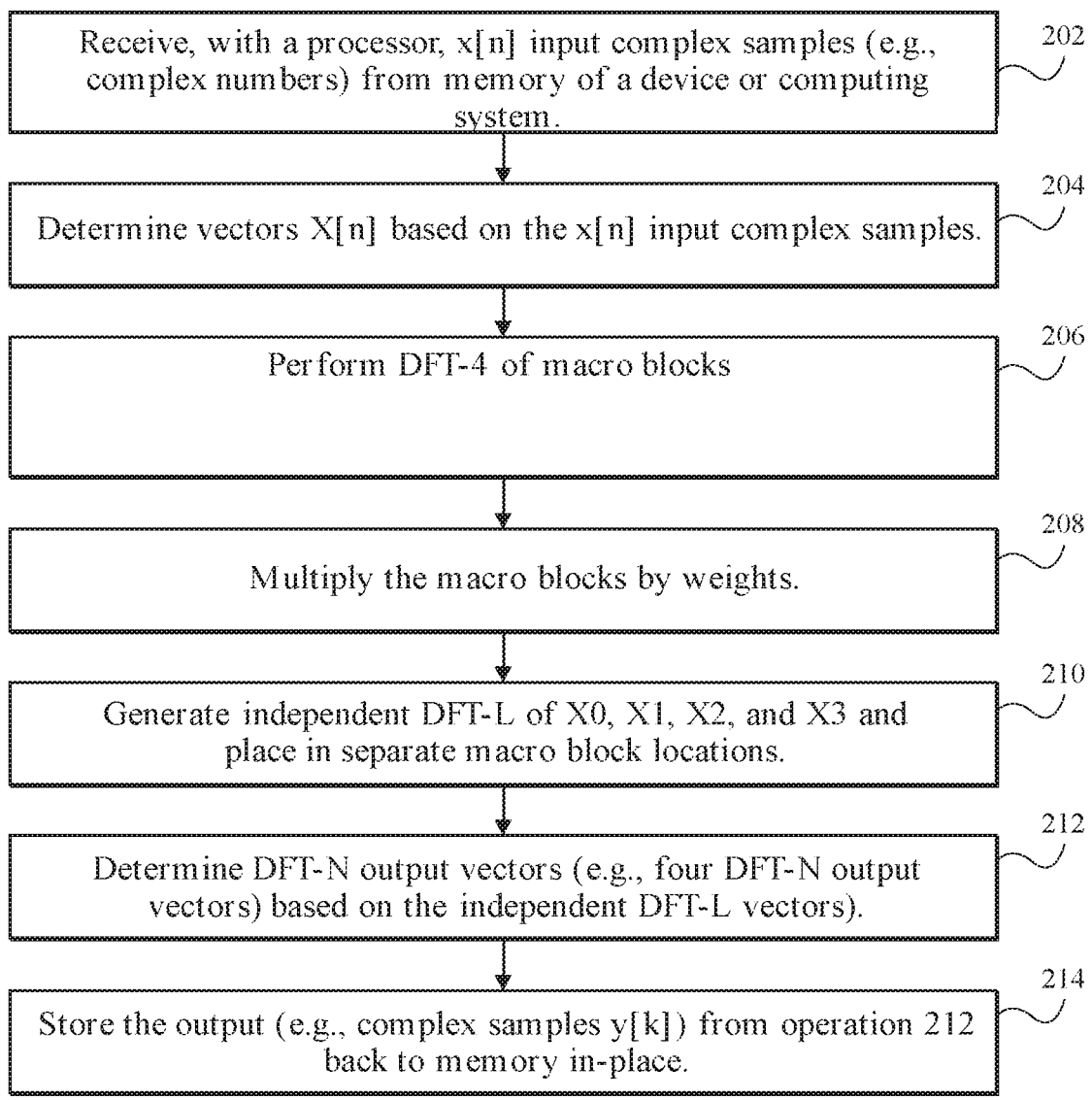
FIG. 2 illustrates, a method of reducing complexity of DFT-N computations to reduce processing cycles on a processor in accordance with some embodiments.

FIG. 2 illustrates, a method 200 of reducing complexity of DFT-N computations to reduce processing cycles on a processor in accordance with some embodiments. Method 200 represents a DFT-N computation flow chart that can be executed with a processor (e.g., 32-bit processor, 64-bit processor, CPU having vector processing units, multi-core processor, etc.). In one example, N can be a multiple of 16 (e.g., 4*4*L). M can be a multiple of 4.

At operation 202, a processor receives x[n] input complex samples (e.g., complex numbers) from memory of a device or computing system. At operation 204, the processor determines vectors X[n] based on the x[n] input complex samples. In one example, X[n]=[x[4n] x[4n+1] x[4n+2] x[4n+3]]. At operation 206, front-end processing (first stage)

of DFT-4 of 4 macro blocks (e.g., radix-4 multiply-less butterfly of four sections X[0], X[L], X[2L], X[3L]) is performed to generate macro blocks. In one example, a DFT radix 4 of 4 macro blocks is determined with X0, X1, X2, X3=DFT-4 of 4 macro blocks X[0], X[L], X[2L], X[3L].

For FFT algorithms, a butterfly is a portion of a computation that combines results of smaller DFTs into a larger DFT or breaks a larger DFT into sub-transforms. The name "butterfly" is based on a shape of a data-flow diagram in radix-2 case.

At operation 208, the macro blocks are multiplied by weights. In one example, $X1[n]=X1[n]*W^n$, $X2[n]=X2[n]*W^{2n}$, $X3[n]=X3[n]*W^{3n}$ with $W=\exp^{(-i\ 2\pi/M)}$.

At operation 210, independent DFT-L of X0, X1, X2, and X3 are generated and placed in separate macro block locations. For example, Y[4k],Y[4k+1],Y[4k+2],Y[4k+3] can be placed in separate macro block locations.

At operation 212, during back-end processing (second stage), DFT-N output vectors (e.g., four DFT-N output vectors) are determined based on the independent DFT-L vectors. In one example, operation 212 includes obtaining four vectors v0-v3 each from Y0-Y3 to be transposed, multiplied by weights, and perform radix-4 multiply-less butterfly of v0-v3. At operation 214, the output (e.g., complex samples y[k]) from operation 212 is stored back to memory in-place.

Operation 212, in one example, for k=0 to L−1 can be expressed as:

$$[v0\ v1\ v2\ v3] = \text{transpose}(Y[4k+1]\ Y[4k+2]\ Y[4k+3]);$$

$$[Y[4k]\ Y[4k+1]\ Y[4k+2]\ Y[4k+3]] = \text{DFT-4}([v0\ v1\ v2\ v3]*[1\ w^k w^{2k} w^{3k}]).$$

The method 200 has reduced complexity with front-end DFT-4 of four blocks in comparison to method 100. Four DFT-L computations are in general less complex using fewer cycles of a processor compared to a single DFT-M computation. This method 200 provides in-place computation of a final output without shuffling or reordering. Instead of needing operation 110 to place Y[k] in linear order of method 100 (e.g., [y[0] y[M] y[2M] y[3M] y[1] y[1+M] y[1+2M] y[1+3M] . . . ] is shuffled or reordered into [y[0] y[1] y[2] y[3] v[4] y[5] y[6] . . . ], the front-end processing (e.g., operations 204, 206, 208, 210) of method 200 places Y[4k], Y[4K+1], Y[4k+2], Y[4k+3] in separate macro block locations. Therefore, 4 vectors, each from Y[4k], Y[4K+1], Y[4k+2], Y[4k+3] can be used to compute 4 DFT-N output vectors, and write the result back to memory in-place without shuffling or reordering.

A DFT-N computation for method 200 can be expressed as follows below.

Given operations 202 and 204, M is a multiple of 4 (e.g., M=4*L), the method proceeds to DFT-M of vectors X[n]: $Y[k]=\Sigma X[n]*W^{nk}$, where $W=\exp^{(-i\ 2\pi/M)}$. For k=0 to L−1, the output vectors Y[k] are decimated into 4 subgroups as follows.

$$Y[4k]=\Sigma X[n]*W^{4nk}$$

$$Y[4k+1]=\Sigma (X[n]*W^n)*W^{4nk}$$

$$Y[4k+2]=\Sigma (X[n]*W^{2n})*W^{4nk}$$

$$Y[4k+3]=\Sigma (X[n]*W^{3n})*W^{4nk}.$$

Then, divide X[n] into 4 blocks starting from X[0], X[L], X[2L], and X[3L], respectively. Note that $W^L=\exp^{(-i*2*\pi*L/M)}=\exp^{(-i*\pi/2)}=-i$, $W^{2L}=-1$, $W^{3L}=-i$. For k=0 to L−1, $$Y[4k]=\Sigma (X[n]+X[n+L]+X[n+2L]+X[n+3L])*W^{4nk}$$

$$Y[4k+1]=\Sigma (X[n]-i*X[n+L]-X[n+2L]+i*X[n+3L])*W^n*W^{4nk}$$

$$Y[4k+2]=\Sigma (X[n]+X[n+L]+X[n+2L]+X[n+3L])*W^{2n}*W^{4nk}$$

$$Y[4k+3]=\Sigma (X[n]+i*X[n+L]-X[n+2L]-i*X[n+3L])*W^{3n}*W^{4nk}.$$

Note the summation range is reduced from M to L=M/4. For front-end DFT-4 of 4 macro blocks, define for n=0 to L−1:

$$X0[n]=(X[n]+X[n+L]+X[n+2L]+X[n+3L])$$

$$X1[n]=(X[n]-i*X[n+L]-X[n+2L]+i*X[n+3L])$$

$$X2[n]=(X[n]+X[n+L]+X[n+2L]+X[n+3L])$$

$$X3[n]=(X[n]+i*X[n+L]-X[n+2L]-i*X[n+3L]).$$

This represents in-place radix-4 multiply-less butterfly of 4 sections X[0], X[L], X[2L], and X[3L] and is equivalent to front-end DFT-4 of the 4 blocks starting from X[0], X[L], X[2L], and X[3L] (e.g., operation 206).

For X1[n], X2[n], X3[n], the present design applies the DFT-M weighting factor (e.g., operation 208) after X1[n], X2[n], X3[n] are derived from operation 206. DFT-M weighting on X1, X2, and X3 (e.g., operation 208) with $W=\exp^{(-i\ 2\pi/M)}$, can be expressed as follows:

$$X1[n]=X1[n]*W^n;$$

$$X2[n]=X2[n]*W^{2n};$$

$$X3[n]=X3[n]*W^{3n}.$$

Next, the present design reduces the original DFT-M of vectors into four separate DFT-L (e.g., operation 210). Let $W'=W^4=\exp^{(-i\ 2\pi*4/M)}=\exp^{(-i\ 2\pi/L)}$, for k=0 to L−1:

$$Y[4k]=\Sigma X0[n]*W'^{nk};\ \text{(DFT-}L\ \text{of}\ X0[n])$$

$$Y[4k+1]=\Sigma X1[n]*W'^{nk};\ \text{(DFT-}L\ \text{of}\ X1[n])$$

$$Y[4k+2]=\Sigma X2[n]*W'^{nk};\ \text{(DFT-}L\ \text{of}\ X2[n])$$

$$Y[4k+3]=\Sigma X3[n]*W'^{nk};\ \text{(DFT-}L\ \text{of}\ X3[n]).$$

Note that y[k], y[M+k], y[2M+k], y[3M+k] are derived from the k-th vector Y[k],

Since the $1^{st}$ stage in-place radix-4 multiply-less butZterfly has already placed Y[k] into 4 separated sections, the present design uses 4 vectors of Y[k] from each section, performs the final computation on each Y[k] vector computation y[k]=y0[k % M]+w^k*y1[k % M]+w^2k*y2[k % M]+w^3k*y3[k % M], and then writes the output vector back to memory in-place. This reduces extra effort for transposing the DFT computation matrix.

As described above, 4 distributed samples y[k], y[k+M], y[k+2M], and y[k+3M] can be derived from a contiguous vector y0[k], y1[k], y2[k], y3[k].

This operation can be vectorized as follows. To further save complexity, 4 vectors from Y[k] are read from the memory:

Y[4k]=[y0[4*k] y1[4*k] y2[4*k] y3[4*k]]', the k-th vector from DFT-L of X0[n] (operation 210);

Y[4k+1]=[y0[4*k+1] y1[4*k+1] y2[4*k+1] y3[4*k+1]]',
the k-th vector from DFT-L of X1[n] (operation 210);
Y[4k+2]=[y0[4*k+2] y1[4*k+2] y2[4*k+2] y3[4*k+2]]',
the k-th vector from DFT-L of X2[n] (operation 210); and
Y[4k+3]=[y0[4*k+3] y1[4*k+3] y2[4*k+3] y3[4*k+3]]'
the k-th vector from DFT-L of X3[n] (operation 210).

The present design then transposes them into 4 vectors (e.g., operation 212):

$$v0=[y0[4*k]\ y0[4*k+1]\ y0[4*k+2]\ y0[4*k+3]]'$$

$$v1=[y1[4*k]\ y1[4*k+1]\ y1[4*k+2]\ y1[4*k+3]]'$$

$$v2=[y2[4*k]\ y2[4*k+1]\ y2[4*k+2]\ y2[4*k+3]]'$$

$$v3=[y3[4*k]\ y3[4*k+1]\ y3[4*k+2]\ y3[4*k+3]]'.$$

After v1,v2,v3 are multiplied with DPT-N weighting factor:

$$v1^*=[w\hat{\ }k\ w\hat{\ }(k+1)w\hat{\ }(k+2)w\hat{\ }(k+3)]'$$

$$v2^*=[w\hat{\ }2k\ w\hat{\ }2(k+1)w\hat{\ }2(k+2)w\hat{\ }2(k+3)]'$$

$$v3^*=[w\hat{\ }3k\ w\hat{\ }3(k+1)w\hat{\ }3(k+2)w\hat{\ }3(k+3)]'.$$

Then another radix-4 multiply-less butterfly of v0-v3 would yield the output to be stored back to memory in-place (e.g., operation 214):

$$Y[4*k]=v0+v1+v2+v3;\ //\ \text{same location as}\ Y[4k]$$

$$Y[4*k+M/4]=v0-i*v1-v2+i*v3;\ //\ \text{same location as}\ Y[4k+1]$$

$$Y[4*k+M/2]=v0-v1+v2-v3;\ //\ \text{same location as}\ Y[4k+2]$$

$$Y[4*k+3M/4]=v0+i*v1-v2*-v3;\ //\ \text{same location as}\ Y[4k+3].$$

Figure 3:
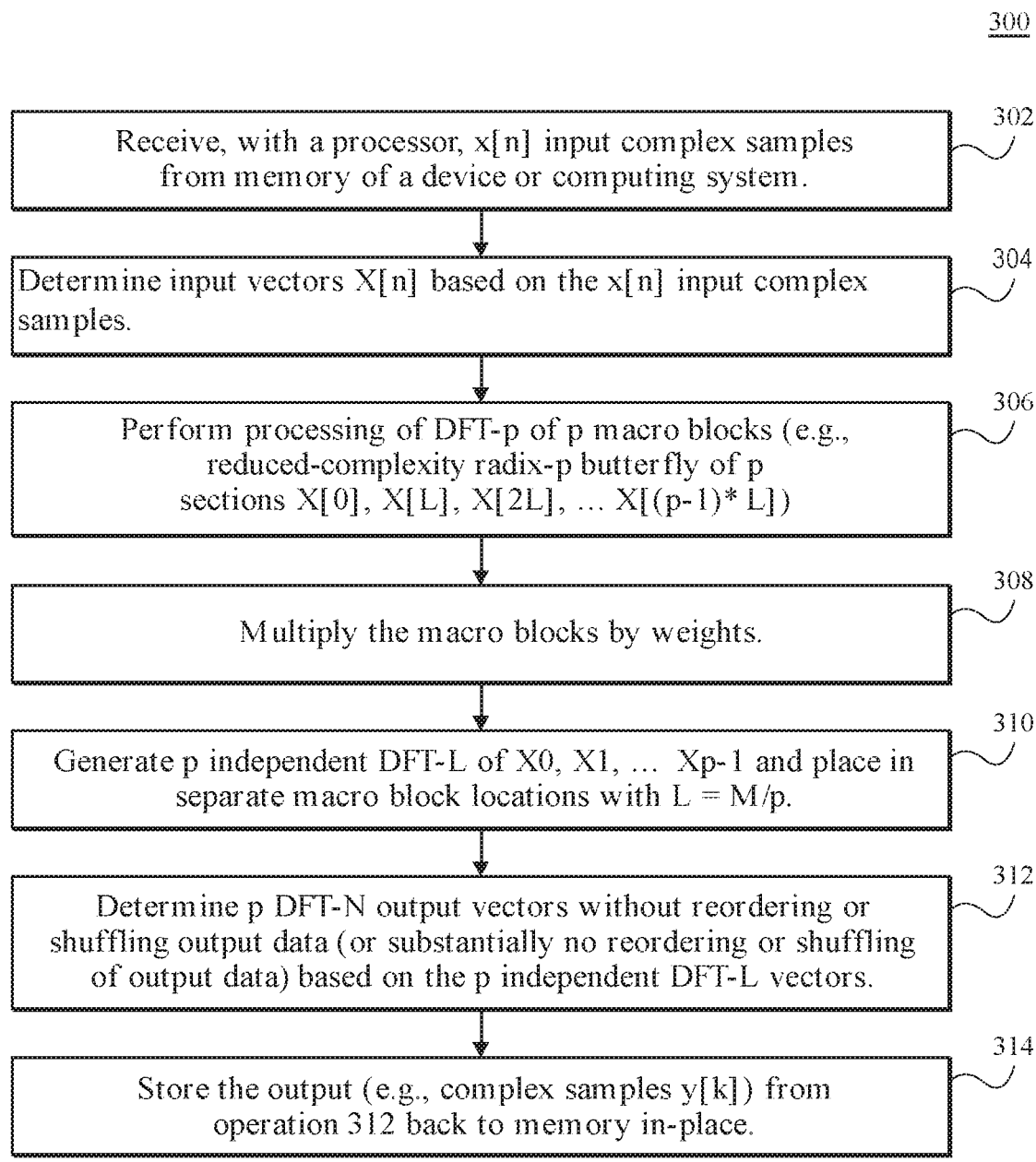
FIG. 3 illustrates, a method of reducing complexity of DFT-N computations to reduce processing cycles on a processor in accordance with another embodiment.

FIG. 3 illustrates, a method 300 of reducing complexity of DFT-N computations to reduce cycles on a processor in accordance with another embodiment. Method 300 represents a DFT-N computation flow chart that can be executed with a processor (e.g., 32-bit processor, 64-bit processor, CPU having vector processing units, multi-core processor, etc.). In one example, N is based on a prime number p (e.g., N=p*p*L). N can be a multiple of $p^2$. In one example, N=90 or 162 which are multiples of 3×3. In another example, N can be a multiple of 3, 4, or 5.

At operation 302, a processor receives x[n] input complex samples from memory of a device or computing system. At operation 304, the processor determines input vectors X[n] based on the x[n] input complex samples. In one example, X[n]=[x[p*n] x[p*n+1] . . . x[p*n+p−1]]. At operation 306, front-end processing (first stage) of DFT-p of p macro blocks (e.g., reduced-complexity radix-p butterfly of p sections X[0], X[L], X[2L], . . . X[(p−1)*L]) is performed to generate p macro blocks. In one example, a DFT radix p of p macro blocks is determined with X0, X1, . . . Xp−1=DFT-p of p macro blocks X[0], X[L], . . . X[[(p−1)*L].

At operation 308, the macro blocks are multiplied by weights. In one example, $X1[n]=X1[n]*W^n$, $X2[n]=X2[n]*W^{2n}$, . . . $Xp-1[n]=Xp-1[n]*W^{(p-1)n}$ with $W=exp(-i\ 2\pi/M)$ and M=N/p. At operation 310, p independent DFT-L of X0, X1, . . . Xp−1 are generated and placed in separate macro block locations with L=M/p. For example, Y[p*k], Y[p*k+1], . . . , Y[p*k+p−1] can be placed in separate macro block locations.

At operation 312, during back-end processing (second stage), p DFT-N output vectors are determined without reordering or shuffling output data (or substantially no reordering or shuffling of output data) based on the p independent DFT-L vectors. In one example, operation 312 includes obtaining p vectors (v0, v1, . . . vp−1) each from Y[p*k], Y[p*k+1], . . . , Y[p*k+p−1] to be transposed, multiplied by weights ($exp^{(-i\ 2\pi/N)}$), and perform reduced-complexity radix-p butterfly of (v0, v1, . . . vp−1) for p in general. The multiply operation is practically manageable when p=3, 5, or 8. The multiply operation complexity normally increases as p increases. For p=2 or 4, the operation 312 performs radix-p multiply-less butterfly of (v0, v1, . . . vp−1). At operation 314, the output (e.g., complex samples y[k]) from operation 312 is stored back to memory in-place.

Operation 312, in one example, for k=0 to L−1 can be expressed as:

$$[v0, v1, \ldots vp-1]=\text{transpose}(Y[p*k]\ldots Y[p*k+p-1]);$$

$$[Y[p*k]\ldots Y[p*k+p-1]]=\text{DFT-}p([v0\ v1\ldots vp-1]*[1\ w^k\ldots w^{(p-1)k}]).$$

The method 300 has reduced complexity with front-end DFT-p of p blocks in comparison to method 100. A sum of p DFT-L computation is in general less complex using fewer cycles of a processor compared to a single DFT-M computation. This method 300 provides in-place computation of a final output. Instead of needing operation 110 to place Y[k] in linear order of method 100 (e.g., [y[0] y[M] y[2M] y[3M] y[1] y[1+M] y[1+2M] y[1+3M] . . . ] is shuffled or reordered into [y[0] y[1] y[2] y[3] y[4] y[5] y[6] . . . ], the front-end processing (e.g., operations 304, 306, 308, 310) of method 300 places Y[p*k], Y[p*k+1], . . . , Y[p*k+p−1] in separate macro block locations. Therefore, p vectors, each from: Y[p*k], Y[p*k+1], . . . , Y[p*k+p−1] can be used to compute p DFT-N output vectors, and write the result back to memory in-place without shuffling or reordering.

Figure 4:
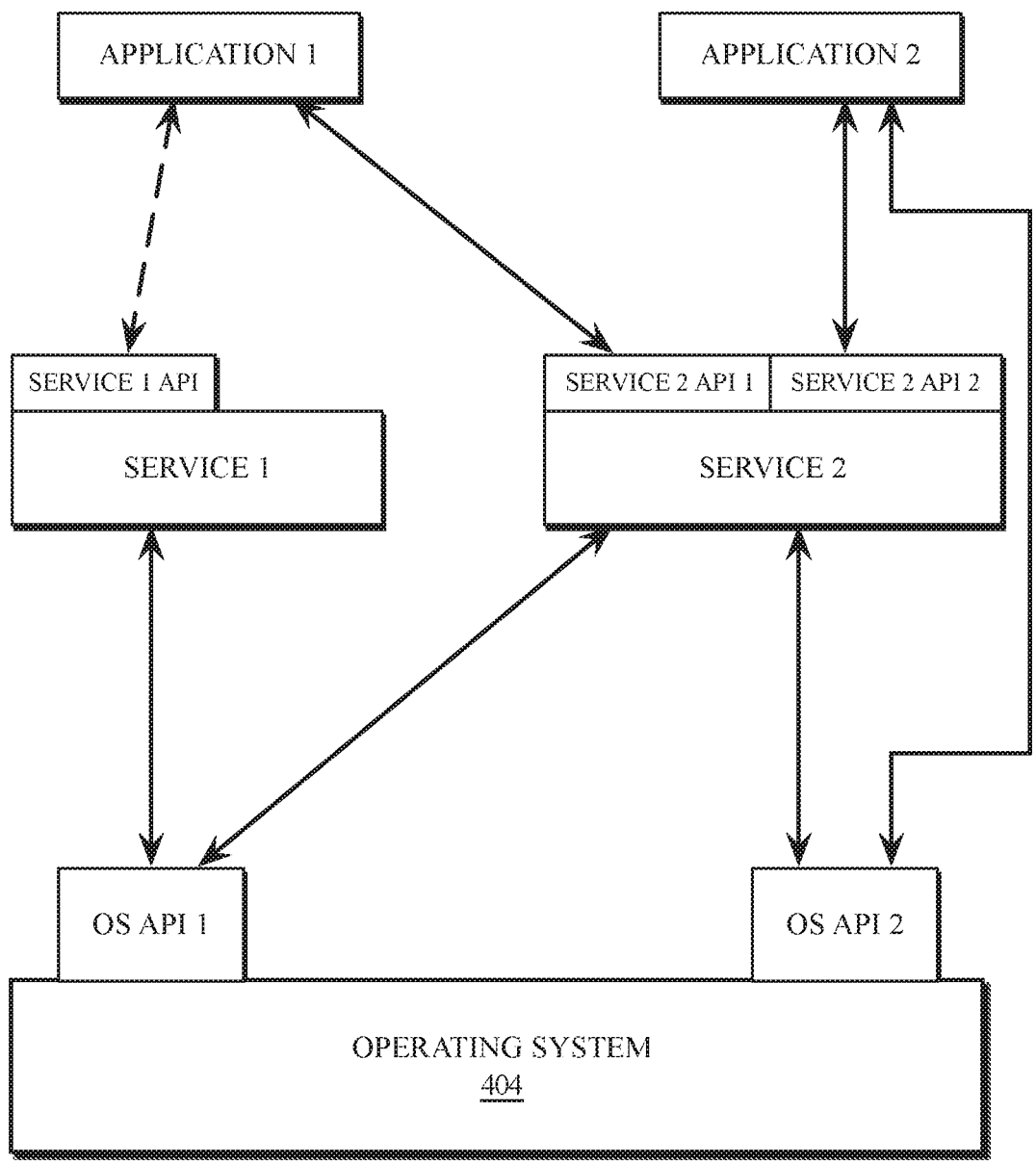
FIG. 4 illustrates an exemplary application programming interface (API) for use in a system for complexity reduction in DFT computation on a processor comprising a plurality of core types each having one or more cores, according to some embodiments.

FIG. 4 illustrates an exemplary application programming interface (API) for use in a system for complexity reduction in DFT computation on a processor comprising a plurality of core types each having one or more cores, according to some embodiments. In FIG. 4 ("Software Stack 410"), applications can make calls to Services 1 or 2 using several Service APIs and to Operating System (OS) 404 using several OS APIs. Services 1 and 2 can make calls to OS using several OS APIs.

Note that the Service 2 has two APIs, one of which (Service 2. API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 5:
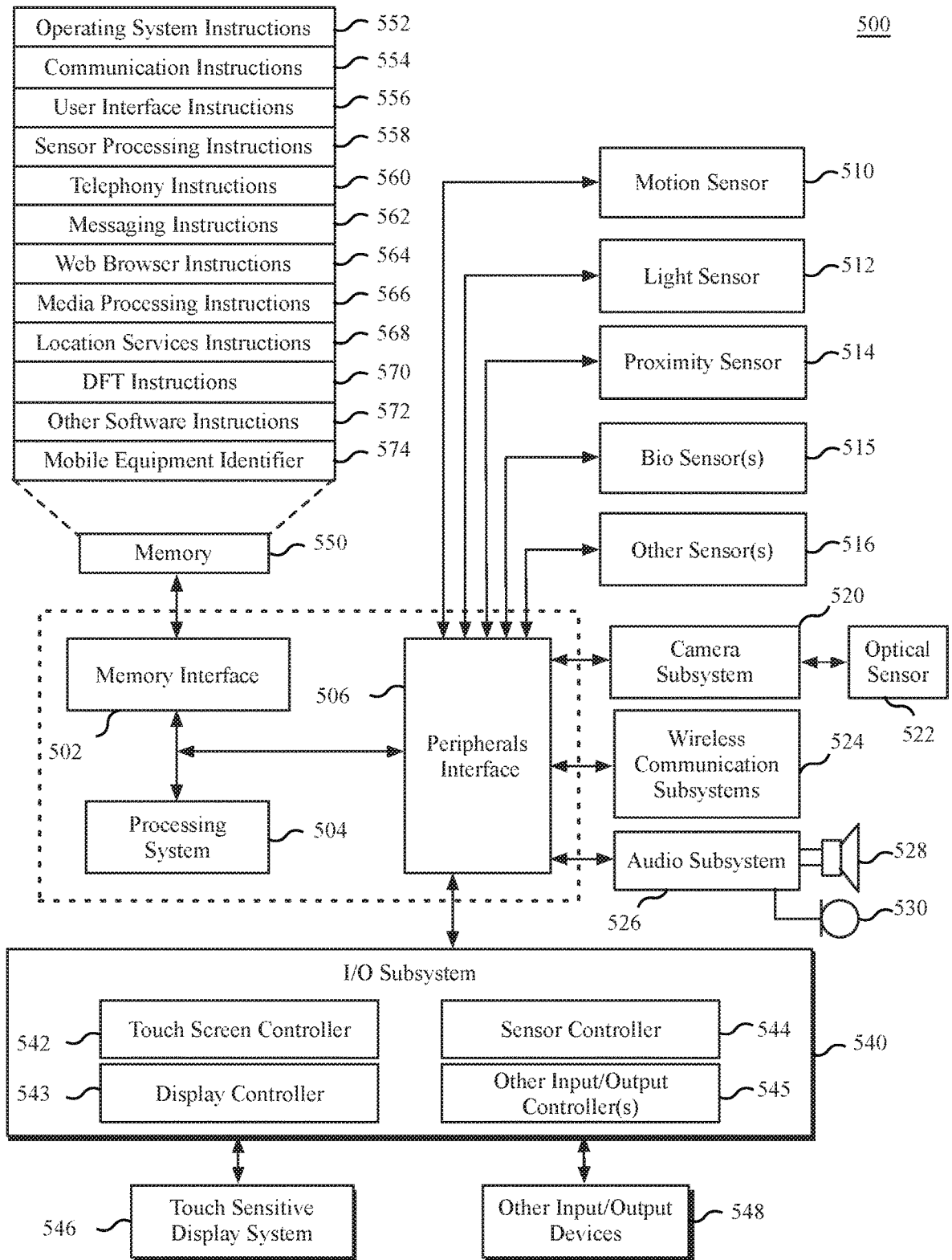
FIG. 5 is a block diagram of a device architecture for a mobile or embedded device, according to an embodiment.

FIG. 5 is a block diagram of a device architecture 500 for a mobile or embedded device, according to an embodiment. The device architecture 500 includes a memory interface 502, a processing system 504 including one or more data processors, image processors and/or graphics processing units, and a peripherals interface 506. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. The various components can be coupled by one or more communication buses or signal lines. The various components can be separate logical components or devices or can be integrated in one or more integrated circuits, such as in a system on a chip integrated circuit. The memory interface 502 can be coupled to memory 550, which can include high-speed random-access memory such as static random-access memory (SRAM) or dynamic random-access memory (DRAM) and/or non-volatile memory, such as but not limited to flash memory (e.g., NAND flash, NOR flash, etc.). Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate the mobile device functionality. One or more biometric sensor(s) 515 may also be present, such as a fingerprint scanner for fingerprint recognition or an image sensor for facial recognition. Other sensors 516 can also be connected to the peripherals interface 506, such as a positioning system (e.g., GPS receiver), a temperature sensor, or other sensing device, to facilitate related functionalities. A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters that can be configured receive or transmit data packets and/or data streams from a remote source. The specific design and implementation of the wireless communication subsystems 524 can depend on the communication network(s) over which a mobile device is intended to operate. For example, a mobile device including the illustrated device architecture 500 can include wireless communication subsystems 524 designed to operate over a GSM network, a CDMA network, an LTE network, a Wi-Fi network, a Bluetooth network, or any other wireless network. In particular, the wireless communication subsystems 524 can provide a communications mechanism over which a media playback application can retrieve resources from a remote media server or scheduled events from a remote calendar or event server.

An audio subsystem 526 can be coupled to a speaker 528 and a microphone 530 to facilitate voice-enabled functions, such as voice recognition, voice replication, digital recording, and telephony functions. In smart media devices described herein, the audio subsystem 526 can be a high-quality audio system including support for virtual surround sound.

The I/O subsystem 540 can include a touch screen controller 542 and/or other input controller(s) 545. For computing devices including a display device, the touch screen controller 542 can be coupled to a touch sensitive display system 546 (e.g., touch-screen). The touch sensitive display system 546 and touch screen controller 542 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 546. Display output for the touch sensitive display system 546 can be generated by a display controller 543. In one embodiment, the display controller 543 can provide frame data to the touch sensitive display system 546 at a variable frame rate.

In one embodiment, a sensor controller 544 is included to monitor, control, and/or processes data received from one or more of the motion sensor 510, light sensor 512, proximity sensor 514, or other sensors 516. The sensor controller 544 can include logic to interpret sensor data to determine the occurrence of one of more motion events or activities by analysis of the sensor data from the sensors.

In one embodiment, the I/O subsystem 540 includes other input controller(s) 545 that can be coupled to other input/control devices 548, such as one or more buttons, rocker switches, thumb-wheel, infrared port, USB port, and/or a pointer device such as a stylus, or control devices such as an up/down button for volume control of the speaker 528 and/or the microphone 530.

In one embodiment, the memory 550 coupled to the memory interface 502 can store instructions for an operating system 552, including portable operating system interface (POSIX) compliant and non-compliant operating system or an embedded operating system. The operating system 552 may include instructions for handling basic system services and for performing hardware dependent tasks. In some implementations, the operating system 552 can be a kernel.

The memory 550 can also store communication instructions 554 to facilitate communicating with one or more additional devices, one or more computers and/or one or more servers, for example, to retrieve web resources from remote web servers. The memory 550 can also include user interface instructions 556, including graphical user interface instructions to facilitate graphic user interface processing.

Additionally, the memory 550 can store sensor processing instructions 558 to facilitate sensor-related processing and functions including DFT computations (or FFT computations) for angle of arrival and time of flight measurements; telephony instructions 560 to facilitate telephone-related processes and functions such as DFT computations for voice telephony; messaging instructions 562 facilitate electronic-messaging related processes and functions; web browser instructions 564 to facilitate web browsing-related processes and functions; media processing instructions 566 to facilitate media processing-related processes and functions including DFT computations (or FFT computations) for audio applications, audio codes, etc.; location services instructions including GPS and/or navigation instructions 568 and Wi-Fi based location instructions to facilitate location based functionality; DFT instructions 570 (or FFT instructions) to facilitate DFT computations (or FFT computations) and functions as described herein including voice processing (telephony), voice synthesis (recognition), audio applications, angle of arrival, time of flight, audio codes such as AAC-ELD (enhanced low delay), MP3; and/or other software instructions 572 to facilitate other processes and functions, e.g., security processes and functions, and processes and functions related to the systems. An angle of arrival (AoA) measurement is a method for determining a direction of propagation of a radio-frequency wave that is incident on an antenna array of the device 500. AoA can be used for geodesic location or geolocation of mobile devices. The memory 550 may also store other software instructions such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. A mobile equipment identifier, such as an International Mobile Equipment Identity (IMEI) 574 or a similar hardware identifier can also be stored in memory 550.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions may be implemented in hardware and/or in software, including in one or more signal processing and/or application specific integrated circuits that can process DFT computations (or FFT computations).

Figure 6:
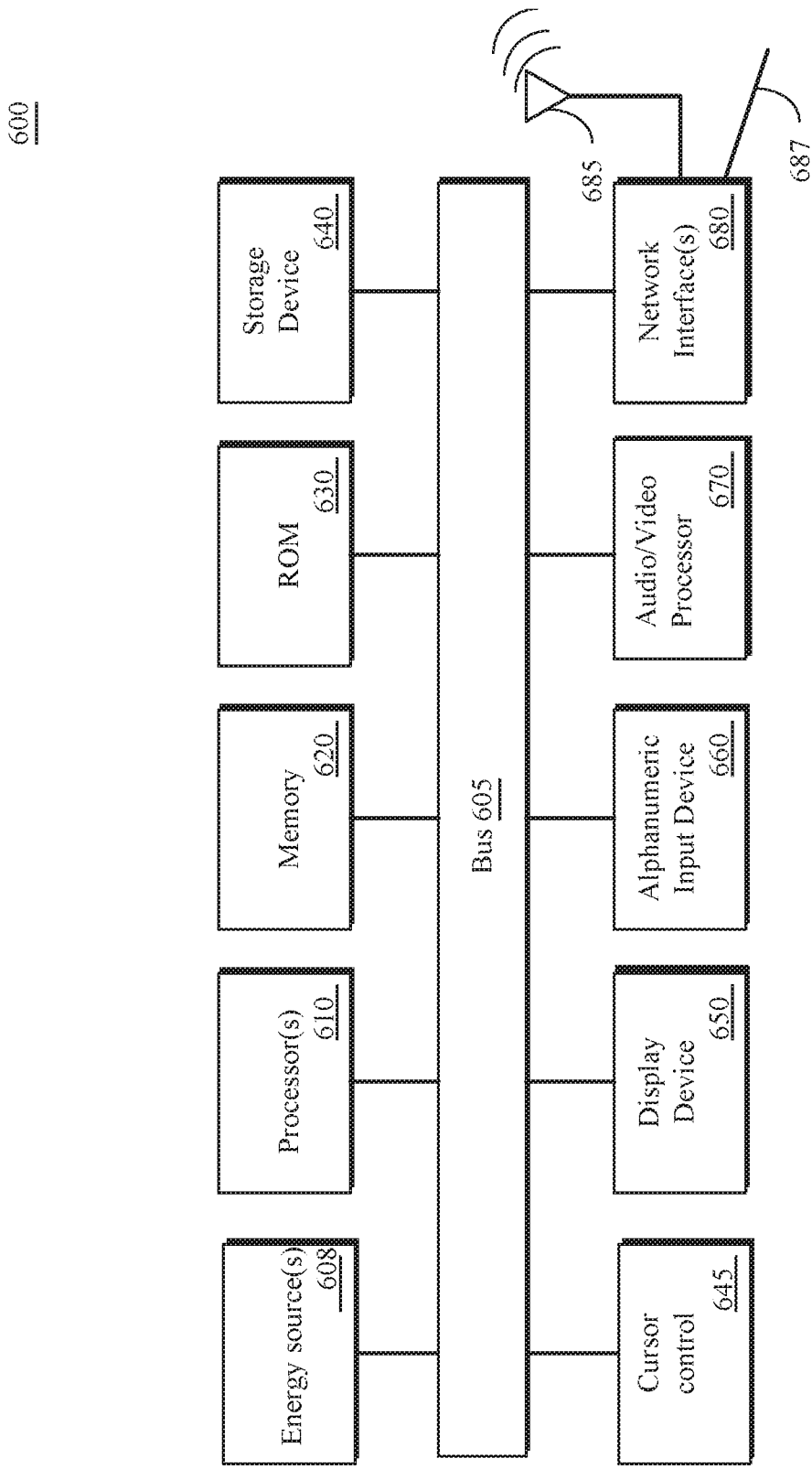
FIG. 6 illustrates, in block form, a computing system that can implement complexity reduction in DFT computations, according to some embodiments.

FIG. 6 illustrates, in block form, a computing system 600 that can implement complexity reduction in DFT computations, according to some embodiments.

The computing system illustrated in FIG. 6 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices.

Alternative computing systems may include more, fewer and/or different components. The computing system of FIG. 6 may be used to provide the computing device and/or the server device.

Computing system 600 includes bus 605 or other communication device to communicate information, and processor(s) 610 coupled to bus 605 that may process information.

While computing system 600 is illustrated with a single processor, computing system 600 may include multiple processors and/or co-processors in processor 610. Processor 610 can include a plurality of core types. Processor 610 can comprise a symmetric multiprocessing complex (SMP) having a plurality of cores that are configured in a plurality of different configurations. Processor 610 can comprise an asymmetric multiprocessing system having a plurality of different core types, each having one or more cores. Core types can include performance cores, efficiency cores, graphics cores, and arithmetic processing cores. A performance core can have an architecture that is designed for very high throughput and may include specialized processing such as pipelined architecture, floating point arithmetic functionality, graphics processing, or digital signal processing. A performance core may consume more energy per instruction than an efficiency core. An efficient processor may include a general purpose processor that can process input/output (I/O) such as for block storage, data streams, interfacing to a display, processing integer arithmetic, and other general processing functionality. An efficient core may consume less energy per instruction than a performance core. Processor 610 can comprise a system on a chip (SoC).

Computing system 600 further may include random access memory (RAM) or other dynamic storage device 620 (referred to as main memory), coupled to bus 605 and may store information and instructions that may be executed by processor 610. The instructions may facilitate DFT computations (or FFT computations) and functions as described herein including voice processing (telephony), voice synthesis (recognition), audio applications, angle of arrival, time of flight, audio codes such as AAC-ELD (enhanced low delay), MP3. Main memory 620 may also be used to store temporary variables or other intermediate information during execution of instructions by processor 610.

Computing system 600 may also include read only memory (ROM) 630 and/or other static storage device 640 coupled to bus 605 that may store static information and instructions for processor complex 610. Data storage device 640 may be coupled to bus 605 to store information and instructions. Data storage device 640 such as flash memory or a magnetic disk, optical disc, solid state disc, writeable or rewriteable compact disc, and corresponding drive may be coupled to computing system 600.

Computing system 600 may further include a power or energy source 608. Computing system 600 may also be coupled via bus 605 to display device 650, such as a liquid crystal display (LCD), light emitting diode (LED) display, or touch screen, to display information to a user. Computing system 600 can also include an alphanumeric input device 660, including alphanumeric and other keys, which may be coupled to bus 605 to communicate information and command selections to processor 610. An alphanumeric keypad can be implemented as keypad images on a touch screen display. Another type of user input device is cursor control 645, such as a touchpad, a mouse, a trackball, touch screen input or cursor direction keys to communicate direction information and command selections to processor 610 and to control cursor movement on display device 650. Computing system 600 may also receive user input from a remote device that is communicatively coupled to computing system 600 via one or more network interfaces 680.

Computing system 600 can further include an audio, video, or audio/video processor 670. An audio processor may include a digital signal processor, memory, one or more analog to digital converters (ADCs), digital to analog converters (DACs), digital sampling hardware and software, one or more coder-decoder (coded) modules, and other components. A video processor can include one or more video encoders, camera, display, and the like. The audio or video processor may implement DFT computations (or FFT computations) as described herein.

Computing system 600 further may include one or more network interface(s) 680 to provide access to a network, such as a local area network. Network interface(s) 680 may include, for example, a wireless network interface having antenna 685, which may represent one or more antenna(e). Computing system 600 can include multiple wireless network interfaces such as a combination of WiFi, Bluetooth® and cellular telephony interfaces. Network interface(s) 680 may also include, for example, a wired network interface to communicate with remote devices via network cable 687, which may be, for example, an Ethernet cable, a coaxial cable, a fiber optic cable, a serial cable, or a parallel cable.

In one embodiment, network interface(s) 680 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 680 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method of discrete Fourier transform (DFT) computations on a system comprising a hardware processor, the method comprising:
   receiving, with the hardware processor, input complex samples from memory of the system;
   determining input vectors based on the received input complex samples;
   determining a DFT radix p of p macro blocks based on the input vectors;
   determining, with the hardware processor, p independent DFT-L vectors to reduce complexity of DFT computations to reduce processing cycles of the hardware processor based on the p macro blocks with L being based on p, wherein N is based on $p^2$ and L; and
   generating p DFT-N output vectors to be stored in the memory in-place without reordering or shuffling output data based on the p independent DFT-L vectors.

2. The computer-implemented method of claim 1, wherein determining the DFT radix p of p macro blocks comprises determining reduced-complexity radix-p butterfly of p sections.

3. The computer-implemented method of claim 1, further comprising:
   multiplying the p macro blocks with a first weight of $\exp^{(-i\ 2\pi/M)}$ in which M equals N/p and N is a multiple of $p^2$.

4. The computer-implemented method of claim 1, wherein the p independent DFT-L vectors are placed in separate macro block locations.

5. The computer-implemented method of claim 1, wherein determining the p DFT-N output vectors without reordering or shuffling output data includes obtaining p vectors, transposing the p vectors, multiplying the transposed p vectors by a second weight of $\exp^{(-i\ 2\pi/N)}$, and performing reduced-complexity radix-p butterfly of the p vectors.

6. The computer-implemented method of claim 5, further comprising:
   storing p DFT-N output vectors including complex samples back to memory in-place.

7. A non-transitory computer-readable medium having executable instructions stored thereon, that when executed by a processing system comprising at least one hardware processor coupled to a memory perform operations, the operations comprising:
   receiving, with the hardware processor, input complex samples from memory of the system;
   determining input vectors based on the received input complex samples;
   determining a DFT radix p of p macro blocks based on the input vectors;
   determining, with the hardware processor, p independent DFT-L vectors to reduce complexity of DFT computations to reduce processing cycles of the hardware processor based on the p macro blocks with L being based on p, wherein N is based on $p^2$ and L; and
   generating p DFT-N output vectors to be stored in the memory in-place without reordering or shuffling output data based on the p independent DFT-L vectors.

8. The medium of claim 7, wherein determining the DFT radix p of p macro blocks comprises determining reduced-complexity radix-p butterfly of p sections.

9. The medium of claim 7, the operations further comprising:
   multiplying the p macro blocks with a first weight of $\exp^{(-i\ 2\pi/M)}$ in which M equals N/p and N is a multiple of $p^2$.

10. The medium of claim 7, wherein the p independent DFT-L vectors are placed in separate macro block locations.

11. The medium of claim 7, wherein determining the p DFT-N output vectors without reordering or shuffling output data includes obtaining p vectors, transposing the p vectors, multiplying the transposed p vectors by a second weight of $\exp^{(-i\ 2\pi/N)}$, and performing reduced-complexity radix-p butterfly of the p vectors.

12. The medium of claim 11, the operations further comprising:
   storing p DFT-N output vectors including complex samples back to memory in-place.

13. A processing system comprising:
   memory programmed with instructions; and
   at least one hardware processor coupled to the memory, the at least one hardware processor to execute the instructions to receive input complex samples from memory of the system, to determine input vectors based on the received input complex samples, to determine a DFT radix p of p macro blocks based on the input vectors with p being a prime number, to determine p independent DFT-L vectors to reduce complexity of DFT computations to reduce processing cycles of the at least one hardware processor based on the p macro blocks with L being based on p, wherein N is based on $p^2$ and L, and to generate p DFT-N output vectors to be stored in the memory in-place without reordering or shuffling output data based on the p independent DFT-L vectors.

14. The processing system of claim 13, wherein to determine the DFT radix p of p macroblocks comprises determining reduced-complexity radix-p butterfly of p sections.

15. The processing system of claim 13, wherein the at least one hardware processor to execute the instructions to place the p independent DFT-L vectors in separate macro block locations.

16. A computer-implemented method of discrete Fourier transform (DFT) computations on a system comprising a hardware processor, the method comprising:
   receiving, with the hardware processor, input complex samples from memory of the system;
   determining input vectors based on the received input complex samples;
   determining a DFT of macro blocks based on the input vectors;
   determining, with the hardware processor, independent DFT-L vectors to reduce complexity of DFT computations to reduce processing cycles of the hardware processor based on the macro blocks; and
   generating DFT-N output vectors to be stored in the memory in-place without reordering or shuffling output data based on the independent DFT-L vectors, wherein N is a multiple of 16 and L=N/16.

17. The computer-implemented method of claim 16, wherein determining the DFT of macro blocks comprises determining multiply-less butterfly of M sections, wherein N is a multiple of 16, M=N/4, and L=M/4.

18. The computer-implemented method of claim 16, further comprising:
   multiplying the macro blocks with a first weight of $\exp^{(-i\ 2\pi/M)}$.

19. The computer-implemented method of claim 16, wherein the independent DFT-L vectors are placed in separate macro block locations.

20. The computer-implemented method of claim 16, wherein determining the DFT-N output vectors without reordering or shuffling output data includes obtaining vectors, transposing the vectors, multiplying the transposed vectors by a second weight of $\exp^{(-i\,2\pi/N)}$, and performing multiply-less butterfly of the vectors.

21. A non-transitory computer-readable medium having executable instructions stored thereon, that when executed by a processing system comprising at least one hardware processor coupled to a memory perform operations, the operations comprising:

receiving, with the hardware processor, input complex samples from memory of the system;

determining input vectors based on the received input complex samples;

determining a DFT of macro blocks based on the input vectors;

determining, with the hardware processor, independent DFT-L vectors to reduce complexity of DFT computations to reduce processing cycles of the hardware processor based on the macro blocks; and generating DFT-N output vectors to be stored in the memory in-place without reordering or shuffling output data based on the independent DFT-L vectors, wherein N is a multiple of 16 and L=N/16.

22. The medium of claim 21, wherein determining the DFT radix macro blocks comprises determining multiply-less butterfly of M sections, wherein N is a multiple of 16, M=N/4, and L=M/4.

23. The medium of claim 21, wherein the independent DFT-L vectors are placed in separate macro block locations.

* * * * *